Patented Dec. 9, 1924.

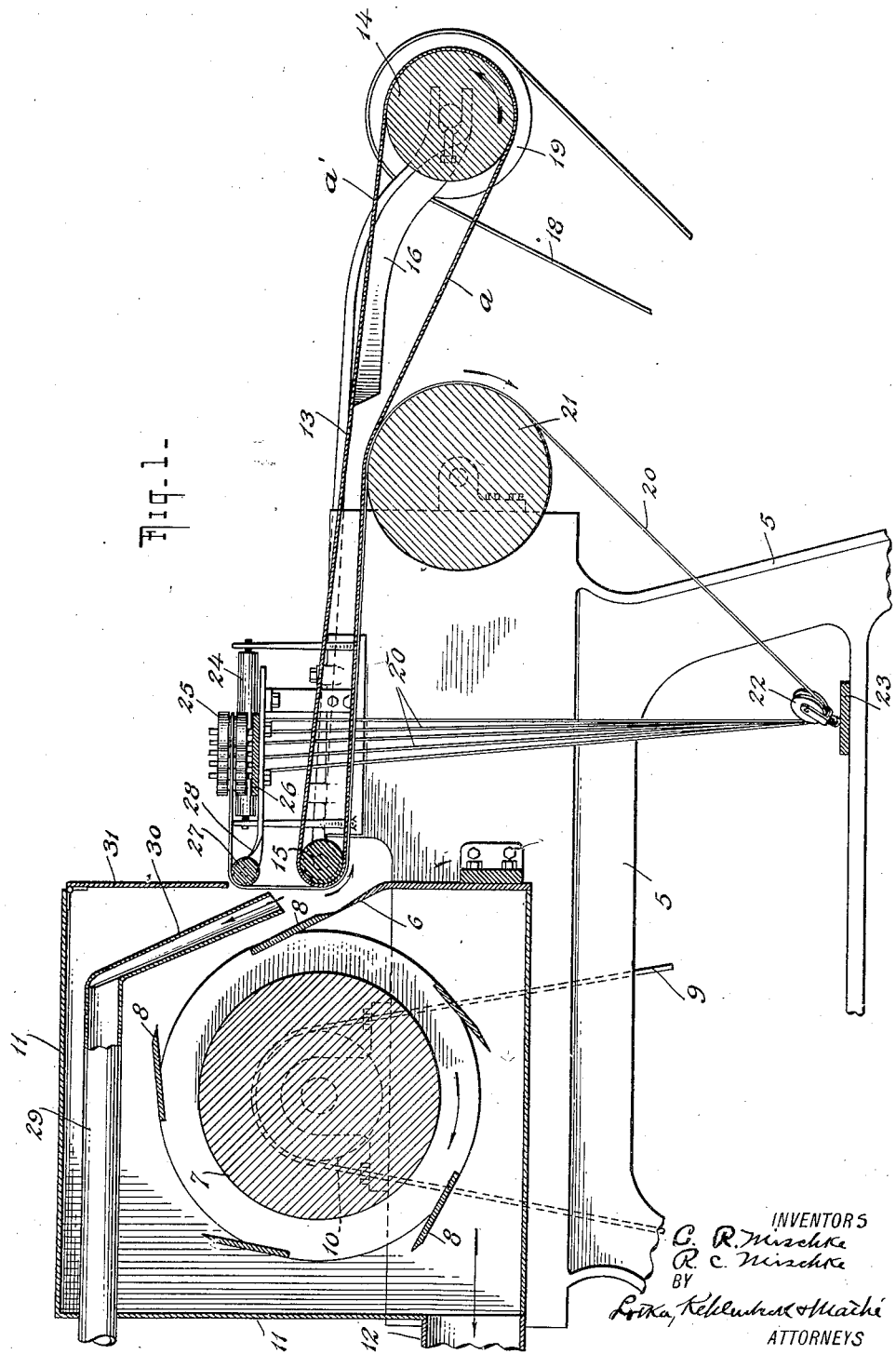

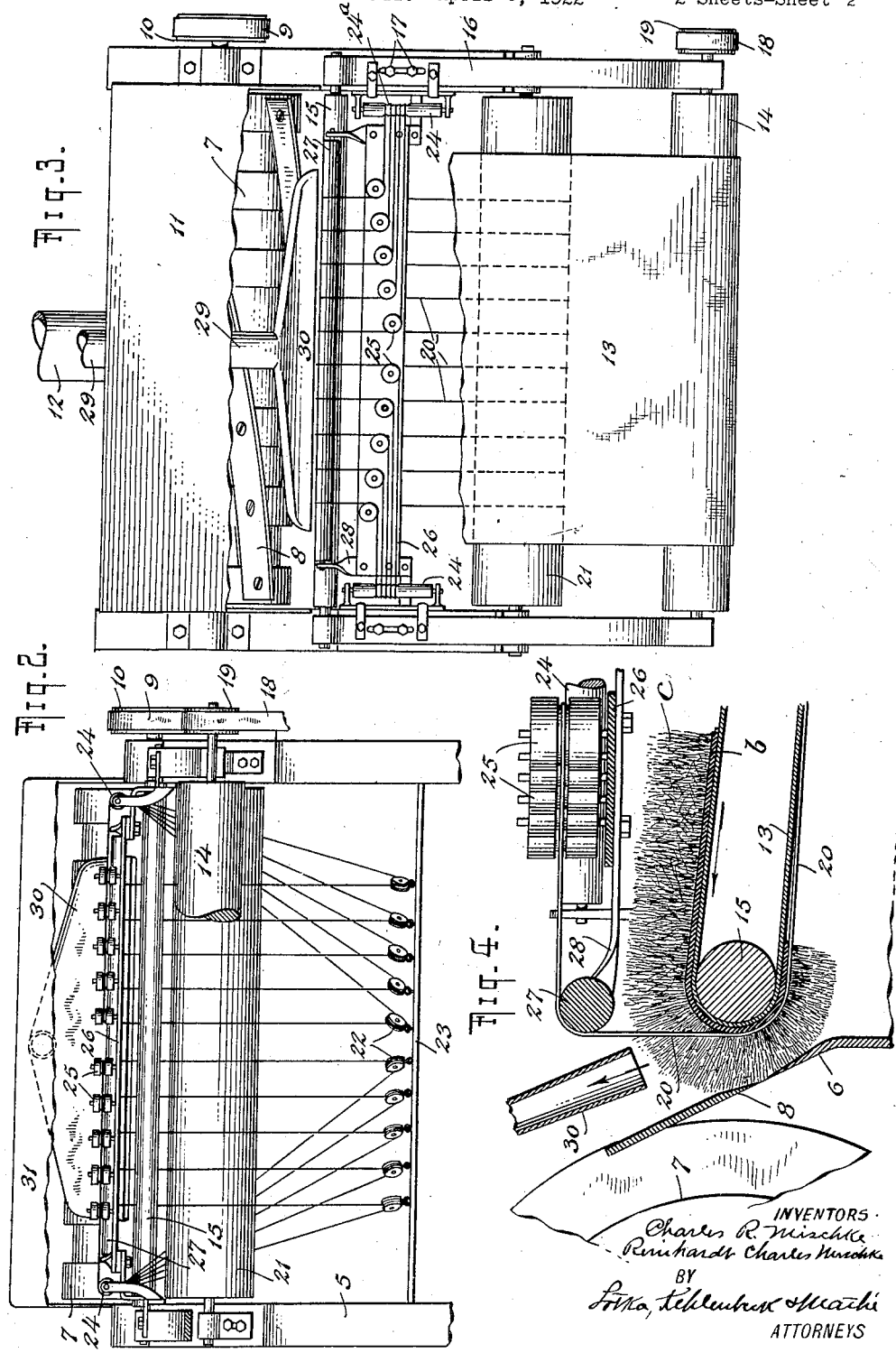

1,518,596

UNITED STATES PATENT OFFICE.

CHARLES R. MISCHKE AND REINHARDT CHARLES MISCHKE, OF BROOKLYN, NEW YORK.

FUR-SHEARING MACHINE.

Application filed April 6, 1922. Serial No. 550,038.

*To all whom it may concern:*

Be it known that we, CHARLES R. MISCHKE and REINHARDT CHARLES MISCHKE, both citizens of the United States, and residents of the borough of Brooklyn, county of Kings, city and State of New York, have invented certain new and useful Improvements in Fur-Shearing Machines, of which the following is a specification.

Our invention relates to machines for shearing fur whereby the fur is trimmed and which, generally speaking, include a cutting mechanism and a traveling conveyor whereby the skins to be trimmed are carried thereto. Heretofore it has been the practice to attach a number of skins, for instance fifty, together in end-to-end relation by means of sewing and then start the same through the machine, the leading skin being pinned or otherwise temporarily fastened to the conveyor. This operation is time-consuming, requires the services of special operators, results in a waste of thread, and is expensive. The particular object of our invention is to overcome these objections and to provide a novel and improved arrangement whereby the necessity for sewing the skins together and the consequent expense and consumption of time is avoided. Our invention will be fully described hereinafter and the features of novelty thereof will be pointed out in the appended claims.

In the accompanying drawings, which illustrate an example of our invention without defining its limits, Fig. 1 is a fragmentary sectional elevation of a fur-shearing machine with our improvements incorporated therein; Fig. 2 is an end elevation with the conveyor omitted for the sake of clearness; Fig. 3 is a fragmentary plan view and Fig. 4 is a detail sectional view on an enlarged scale.

It will be understood that the shearing machine may be of any suitable construction and as shown in the drawings may comprise a conventional supporting frame 5 on which the cutting or shearing mechanism is mounted. The latter may consist of a stationary cutter 6 and a rotatable drum 7 carrying a plurality of cutters 8 at spaced intervals and arranged to be successively brought into operative co-relation with stationary cutter 6 as the drum 7 is rotated; the latter may be rotatably actuated in any conventional manner as by means of a belt 9 and pulley 10. The drum 7 and its cutters 8 is preferably mounted within a chamber 11 supported upon the frame 5 and connected with a source of suction by means of a pipe 12 in the well-known way as shown in Fig. 1.

The machine further includes a conveyor 13, which may comprise an endless canvas apron passing over rollers 14 and 15, the latter or inner being located in close proximity to the stationary cutter 6 as illustrated in Fig. 1, while the outer roller 14 is journalled upon brackets 16 adjustably mounted upon the frame 5 and fixed in place by means of bolts 17. The conveyor 13 may be driven in any convenient and suitable way as by means of a belt 18 and pulley 19. As so far described the machine may be of any well-known type and include any and all features commonly found in machines of the character set forth.

As illustrated in the drawings our improvement comprises a plurality of endless bands, cords or wires 20 which extend in engagement with the lower run *a* of the conveyor 13 throughout a part of the length thereof as shown in Fig. 1 and are arranged in spaced, parallel relation as shown in Fig. 3. The bands, cords or wires 20 travel over an intermediate roller 21 which is journaled on the support 5 over which the lower run *a* of the conveyor 13 also passes as shown in Fig. 1 and then pass downwardly and over individual pulleys 22 located upon a cross-bar 23 of the support 5. From the pulleys 22 the bands, cords or wires 20 pass upwardly over rollers 24 by which they are diverted inwardly toward individual pulleys 25 mounted upon a cross-bar 25, said rollers 24 being preferably provided with grooves 24$^a$ for the accommodation of the bands, cords or wires 20; the latter travel over said pulleys 25 and over a guide roller 27 journalled at a distance above the roller 15 upon brackets 28 carried by the cross-bar 26 and pass tangentially into contact with the conveyor 13 at the point where it travels over the roller 15 as shown in Fig.

1. In the preferred arrangement a suction tube 29 extends into the chamber 11 and terminates in a relatively wide nozzle 30 projecting downwardly into proximity to the roller 15 and the conveyor 13 and bands 20 passing thereover as shown in Fig. 1; for convenience and to permit access to be readily had to the nozzle 30 and contiguous elements the chamber 11 may be provided with a hinged door 31.

In practice power is applied in any conventional manner to drive the belts 9 and 18 whereby the drum 7 is rotated to successively bring its cutters 8 into co-operative relation with the stationary cutter 6 and the conveyor 13 is actuated in a direction to cause its upper run a' to travel toward the roller 15. Because of the frictional engagement between the lower run a of said conveyor and the bands 20, the latter will be concurrently operated in the directions indicated by the arrows in Fig. 1. The skins b with the fur side upward are placed upon the upper run a' and are carried along thereby and finally pass, with said conveyor around the roller 15, and beneath one or more of the bands 20 as indicated in Fig. 4. As the skins b thus pass about the roller 15 they are clamped upon the conveyor 13 by the action of the bands 20 and are carried along thereby on the lower run a until the roller 21 is reached; at this point the skins are released and either simply drop into a suitable receptacle or are received by an attendant. During their passage about the roller 15 the skins b are bent about the same whereby the fur is caused to stand out and is trimmed or sheared by the action of the cutters 6 and 8. If desired or considered necessary the skins may be passed through the machine a number of times, this being readily possible without difficulty and simply requiring the skins to be replaced upon the upper run a' of the conveyor 13. No care need be exercised in placing the skins b upon the conveyor 13 as the bands 20 will because of their number, properly clamp the same into position to be sheared.

The suction which is effective at the nozzle 30 serves to pull the fur c outward from the skin in proper position for cutting or shearing and overcomes any tendency on the part of said fur to flatten out or lay down during the trimming operation. The fur which is sheared or trimmed by the cutters 6 and 8 is withdrawn from the chamber 11 through the pipe 12 in the customary manner.

The arrangement is novel and efficient in action and reduces the operation of shearing or trimming to the simplest possible point. Our improvements may readily be incorporated in existing machines and do away entirely with the necessity for attaching the skins together and to the conveyor.

Various changes in the specific form shown and described may be made within the scope of the claims without departing from the spirit of our invention.

We claim:

1. In a fur shearing machine, the combination of cutting mechanism, means for conveying the skins to said cutting mechanism and travelling means co-operating with said conveying means only while the skins are passing the cutting mechanism and away therefrom whereby said skins are clamped upon said conveying means during the cutting operation and subsequently thereto, said travelling means having no clamping effect during the passage of the skins toward said cutting mechanism.

2. In a fur shearing machine, the combination of cutting mechanism, a conveyor for carrying the skins to said cutting mechanism and a plurality of devices movable with said conveyor throughout only a part of its travel for clamping said skins thereon during and subsequent to the cutting operation and having no clamping effect before the cutting mechanism is reached.

3. In a fur shearing machine, the combination of cutting mechanism, an endless conveyor for carrying the skins to said cutting mechanism and a plurality of spaced, parallel, relatively thin cords extending adjacent to and travelling with said conveyor from a point contiguous to said cutting mechanism and being otherwise independent thereof, whereby said skins are clamped on said conveyor only during and subsequent to the cutting operation.

4. In a fur shearing machine, the combination of cutting mechanism, an endless conveyor for carrying the skins to said cutting mechanism, a plurality of spaced, parallel, relatively thin cords extending along and travelling with said conveyor whereby said skins are clamped thereon and suction means whereby the fur of said skins is drawn outward in position for shearing.

5. In a fur shearing machine, the combination of a cutting chamber, cutting mechanism therein, an endless conveyor for carrying the skins to said cutting mechanism, a plurality of spaced, parallel, endless, relatively thin cords travelling in part adjacent to said conveyor and being otherwise independent thereof whereby said skins are clamped on said conveyor only during and subsequent to the cutting operation, a suction tube extending into said chamber and a nozzle on said tube arranged to provide suction whereby the fur of said skins is drawn outward in position for shearing.

6. In a fur shearing machine, the combination of cutting means, a roller located contiguous thereto, an endless travelling conveyor passing over said roller in upper and lower runs for carrying the skins to said cutting means and clamping means travelling over said roller and approaching the same tangentially and then travelling along with and adjacent to said conveyor for clamping the skins upon said conveyor during and subsequent to the cutting operation and leaving the upper run of the conveyor free and unobstructed.

7. In a fur-shearing machine, the combination of cutting mechanism, an inner roller contiguous thereto, an outer roller at a distance from said inner roller, an endless belt passing over said inner and outer rollers in upper and lower runs, an intermediate roller over which the lower run of said belt passes, a guide roller located at a distance above said inner roller, a plurality of pulleys located above said belt and rotatable about axes extending transversely thereto and a plurality of flexible, endless members passing over said pulleys and guide roller into tangential relation to said inner roller and into engagement with the lower run of said belt and over said intermediate roller away from said belt whereby the upper run of said belt is free and unobstructed and said flexible members exert a clamping effect upon said belt only during and subsequent to the cutting operation.

8. In a fur shearing machine, the combination with the shearing mechanism and a breast roll of an endless carrier belt passed around the breast roll, means to cause the carrier belt to travel, cords to hold the fur skin in contact with the carrier belt as it passes over the breast roll, and means to support the cords.

9. In a fur shearing machine, the combination with the shearing mechanism and a breast roll of an endless carrier belt passed around the breast roll, means to cause the carrier belt to travel, endless cords to hold the fur skin in contact with the carrier belt and rollers to support and guide the cords.

10. In a fur shearing machine, the combination with the shearing mechanism and a breast roll of an endless carrier belt passed around the breast roll, a driving roll for the carrier belt, endless cords to hold the fur skins upon the carrier belt in its passage about the breast roll, and rollers above and below the carrier belt to support the cords and hold them against the carrier belt.

In testimony whereof we have signed this specification.

CHARLES R. MISCHKE.
REINHARDT CHARLES MISCHKE.